United States Patent
Kim et al.

(10) Patent No.: US 10,310,051 B2
(45) Date of Patent: Jun. 4, 2019

(54) METHOD FOR RECEIVING REFERENCE SIGNAL IN WIRELESS COMMUNICATION SYSTEM AND APPARATUS THEREFOR

(71) Applicant: LG ELECTRONICS INC., Seoul (KR)

(72) Inventors: Kijun Kim, Seoul (KR); Hanbyul Seo, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 297 days.

(21) Appl. No.: 15/129,182

(22) PCT Filed: Jun. 30, 2015

(86) PCT No.: PCT/KR2015/006694
§ 371 (c)(1),
(2) Date: Sep. 26, 2016

(87) PCT Pub. No.: WO2016/003154
PCT Pub. Date: Jan. 7, 2016

(65) Prior Publication Data
US 2018/0180703 A1  Jun. 28, 2018

Related U.S. Application Data

(60) Provisional application No. 62/021,020, filed on Jul. 4, 2014.

(51) Int. Cl.
*G01S 5/02* (2010.01)
*G01S 1/04* (2006.01)
(Continued)

(52) U.S. Cl.
CPC ............. *G01S 5/0226* (2013.01); *G01S 1/04* (2013.01); *G01S 1/042* (2013.01); *G01S 1/20* (2013.01);
(Continued)

(58) Field of Classification Search
CPC . G01S 5/0226; G01S 5/10; G01S 1/20; G01S 5/0221; H04L 5/0048; H04W 64/00
(Continued)

(56) References Cited

U.S. PATENT DOCUMENTS

| | | |
|---|---|---|
| 2011/0110338 A1 | 5/2011 | Khoryaev et al. |
| 2012/0015667 A1 | 1/2012 | Woo et al. |
| 2014/0176366 A1 | 6/2014 | Fischer et al. |

FOREIGN PATENT DOCUMENTS

| | | |
|---|---|---|
| KR | 1020100009463 A | 1/2010 |
| KR | 1020100105347 A | 9/2010 |

(Continued)

*Primary Examiner* — Dao L Phan
(74) *Attorney, Agent, or Firm* — Dentons US LLP

(57) ABSTRACT

A method for receiving a reference signal for defining a location in a wireless communication system according to one embodiment of the present invention comprises the steps of: receiving, from a serving cell, beacon-positioning reference signal (B-PRS) configuration information transmitted by at least one beacon device; and detecting the B-PRS by using the B-PRS configuration information, wherein the B-PRS configuration information includes B-PRS group configuration information for at least one beacon device group, and the B-PRS group configuration information can include parameters for generating sequences of the B-PRS transmitted by each beacon device belonging to the corresponding group.

12 Claims, 8 Drawing Sheets

(51) Int. Cl.
   *G01S 1/20*      (2006.01)
   *G01S 5/10*      (2006.01)
   *H04L 5/00*      (2006.01)
   *H04W 64/00*     (2009.01)

(52) U.S. Cl.
   CPC .......... *G01S 5/0221* (2013.01); *G01S 5/0236* (2013.01); *G01S 5/10* (2013.01); *H04L 5/0048* (2013.01); *H04W 64/00* (2013.01)

(58) Field of Classification Search
   USPC ........................................ 342/386, 419, 442
   See application file for complete search history.

(56)            References Cited

FOREIGN PATENT DOCUMENTS

KR    1020110027626 A    3/2011
   KR    1020140005895 A    1/2014

METHOD FOR RECEIVING REFERENCE SIGNAL IN WIRELESS COMMUNICATION SYSTEM AND APPARATUS THEREFOR

This is application is a National Stage Entry of International Application No. PCT/KR2015/006694 filed Jun. 30, 2015, which claims priority to U.S. Provisional Application No. 62/021,020 filed Jul. 4, 2014, both of which are incorporated by reference for all purposes as if fully set forth herein.

TECHNICAL FIELD

The present invention relates to a wireless communication system, and more particularly, to a method for receiving a reference signal in a wireless communication system and an apparatus therefor.

BACKGROUND ART

Various techniques including Machine-to-Machine (M2M) communication and various devices requiring a high data rate, e.g., smart phones and tablet Personal Computers (PCs), have emerged and gained popularity. As a consequence, the amount of data to be processed in a cellular network is rapidly increasing. To satisfy the rapidly increasing data processing requirement, Carrier Aggregation (CA), cognitive radio, etc. for efficiently using a larger number of frequency bands, and Multiple Input Multiple Output (MIMO), Coordinated Multipoint transmission and reception (CoMP), etc. for increasing the amount of data transmitted in limited frequencies have been developed. Furthermore, communication environments are evolving toward an increased density of nodes accessible by User Equipments (UEs). A node refers to a fixed point having one or more antennas and capable of transmitting or receiving radio signals to or from UEs. A communication system with densely populated nodes can provide high-performance communication services to UEs through cooperation between nodes.

This multi-node cooperative communication scheme in which a plurality of nodes communicate with a UE using the same time-frequency resources offers a higher throughput than in a conventional communication scheme in which each node operates as an independent Base Station (BS) and communicates with a UE without cooperation from other nodes.

A multi-node system performs cooperative communication by using a plurality of nodes, each of which is operating as a BS, an Access Point (AP), an antenna, an antenna group, a Radio Remote Header (RRH) or a Radio Remote Unit (RRU). Compared to a conventional centralized antenna system in which antennas are concentrated in a BS, the plurality of nodes are normally spaced apart from each other by a predetermined distance or more in the multi-node system. The plurality of nodes may be managed by one or more BSs or one or more BS Controllers (BSCs) that control operation of each node or schedule data to be transmitted or received through each node. Each node is connected to a BS or BSC that controls the node through a cable or a dedicated line.

The above-described multi-node system may be regarded as an MIMO system in the sense that distributed nodes can communicate with a single UE or multiple UEs by transmitting or receiving different streams at the same time. However, since signals are transmitted using nodes distributed to various locations, each antenna covers a reduced transmission area in the multi-node system, relative to antennas in the conventional centralized antenna system. As a result, each antenna may need a reduced Tx power in transmitting a signal in the multi-node system, compared to a conventional system that implements MIMO with a centralized antenna system. In addition, as the transmission distance between an antenna and a UE is reduced, path loss is decreased and high-rate data transmission is possible. Accordingly, the transmission capacity and power efficiency of a cellular system may be increased and communication may satisfactorily be performed with uniform quality irrespective of the locations of UEs within a cell. Furthermore, the multi-node system boasts of reduced signal loss during transmission because a BS(s) or BSC(s) connected to a plurality of nodes cooperate in data transmission and reception. Also, if nodes located apart from each other by a predetermined distance or more perform cooperative communication with a UE, correlation and interference between antennas are decreased. Consequently, the multi-node cooperative communication scheme achieves a high Signal-to-Interference plus Noise Ratio (SINR).

Owing to these advantages of the multi-node system, the multi-node system has emerged as a promising basis for cellular communication by substituting for the conventional centralized antenna system or operating in conjunction with the conventional centralized antenna system in order to reduce BS deployment cost and backhaul maintenance cost, extend service coverage, and increase channel capacity and SINR.

DISCLOSURE

Technical Problem

An object of the present invention devised to solve the problem lies in a method for receiving a reference signal in a wireless communication system and a relevant operation.

The technical objects that can be achieved through the present invention are not limited to what has been particularly described hereinabove and other technical objects not described herein will be more clearly understood by persons skilled in the art from the following detailed description.

Technical Solution

The object of the present invention can be achieved by providing a method for receiving a reference signal for position determination in a wireless communication system, the method including receiving, from a serving cell, configuration information about beacon-positioning reference signals (B-PRSs) transmitted by one or more beacon apparatuses, and detecting the B-PRSs using the B-PRS configuration information, wherein the B-PRS configuration information includes B-PRS group configuration information about one or more beacon apparatus groups, wherein the B-PRS group configuration information includes a parameter for generating a sequence of a B-PRS transmitted by each beacon apparatus belonging to a corresponding one of the one or more beacon apparatus groups.

Additionally or alternatively, the parameter may determine a subframe used for each of the beacon apparatuses to transmit a B-PRS therein.

Additionally or alternatively, the parameter determines a frequency shift value used for resource mapping allowing each of the beacon apparatuses to transmit a B-PRS.

Additionally or alternatively, the parameter may determine an offset value for determination of a subframe used for each of the beacon apparatuses to transmit a B-PRS therein.

Additionally or alternatively, the parameter and determine a resource block used for each of the beacon apparatuses to transmit a B-PRS thereon.

Additionally or alternatively, the B-PRS configuration information may include information about a transmit power of the B-PRSs, wherein the transmit power may be designated for each of the B-PRSs or for each of the beacon apparatus groups.

Additionally or alternatively, the method may further include calculating a path loss value for the B-PRSs using the transmit power of the B-PRSs, and triggering a specific event when the calculated path loss value is less than or equal to a threshold.

Additionally or alternatively, the B-PRS configuration information may include information indicating whether or not a terminal should perform measurement of a reference signal time difference (RSTD) or a reference signal received power (RSRP) for the B-PRSs.

Additionally or alternatively, the B-PRS configuration information may include information about a specific reference signal having a dependency relationship with the B-PRSs, wherein the detecting of the B-PRSs may be triggered when the specific reference signal is detected or a reception quality of the specific reference signal is greater than or equal to a threshold.

Additionally or alternatively, the specific reference signal is configured for each of the beacon apparatus groups.

In another aspect of the present invention, provided herein is a terminal configured to receive a reference signal for position determination in a wireless communication system, the terminal including a radio frequency (RF) unit, and a processor configured to control the RF unit, wherein the processors is configured to receive, from a serving cell, configuration information about a beacon-positioning reference signals (B-PRSs) transmitted by one or more beacon apparatuses and to detect the B-PRSs using the B-PRS configuration information, wherein the B-PRS configuration information includes B-PRS group configuration information about one or more beacon apparatus groups, wherein the B-PRS group configuration information includes a parameter for generating a sequence of a B-PRS transmitted by each beacon apparatus belonging to a corresponding one of the one or more beacon apparatus groups.

Additionally or alternatively, the parameter may determine a subframe used for each of the beacon apparatuses to transmit a B-PRS therein.

Additionally or alternatively, the parameter may determine a frequency shift value used for resource mapping allowing each of the beacon apparatuses to transmit a B-PRS.

Additionally or alternatively, the parameter may determine an offset value for determination of a subframe used for each of the beacon apparatuses to transmit a B-PRS therein.

Additionally or alternatively, the parameter may determine a resource block used for each of the beacon apparatuses to transmit a B-PRS thereon.

Additionally or alternatively, the B-PRS configuration information may include information about a transmit power of the B-PRSs, wherein the transmit power may be designated for each of the B-PRSs or for each of the beacon apparatus groups.

Additionally or alternatively, the processor may be configured to calculate a path loss value for the B-PRSs using the transmit power of the B-PRSs and to trigger a specific event when the calculated path loss value is less than or equal to a threshold.

Additionally or alternatively, the B-PRS configuration information may include information indicating whether or not the terminal should perform measurement of a reference signal time difference (RSTD) or a reference signal received power (RSRP) for the B-PRSs.

Additionally or alternatively, the B-PRS configuration information may include information about a specific reference signal having a dependency relationship with the B-PRSs, wherein detection of the B-PRSs may be triggered when the specific reference signal is detected or a reception quality of the specific reference signal is greater than or equal to a threshold.

Additionally or alternatively, the specific reference signal may be configured for each of the beacon apparatus groups.

The above technical solutions are merely some parts of the embodiments of the present invention and various embodiments into which the technical features of the present invention are incorporated can be derived and understood by persons skilled in the art from the following detailed description of the present invention.

Advantageous Effects

According to an embodiment of the present invention, reception and measurement of a reference signal may be efficiently performed in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Figure 1:
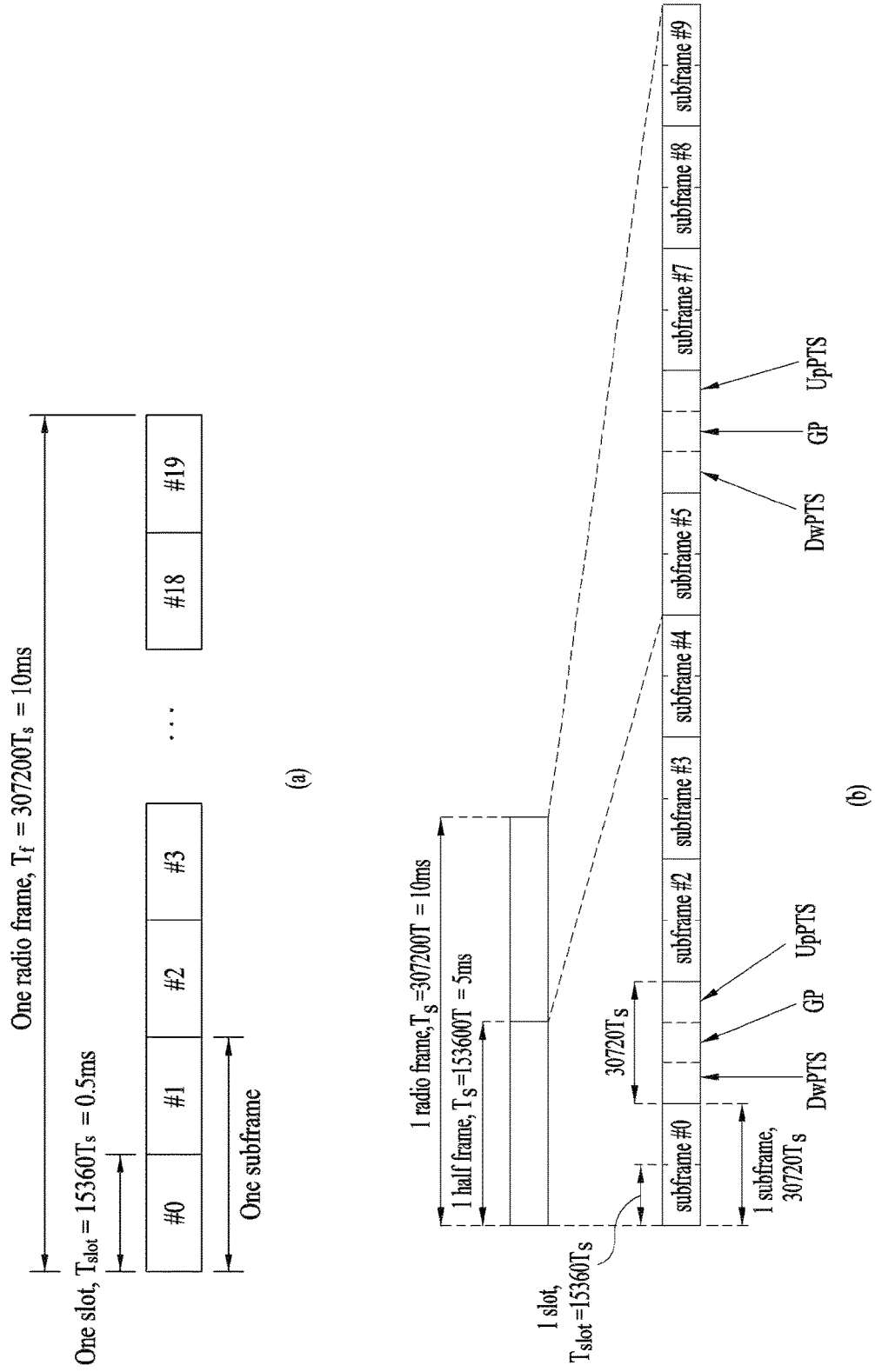
FIG. 1 is a diagram illustrating an example of a structure of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g. a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |

TABLE 2-continued

| | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
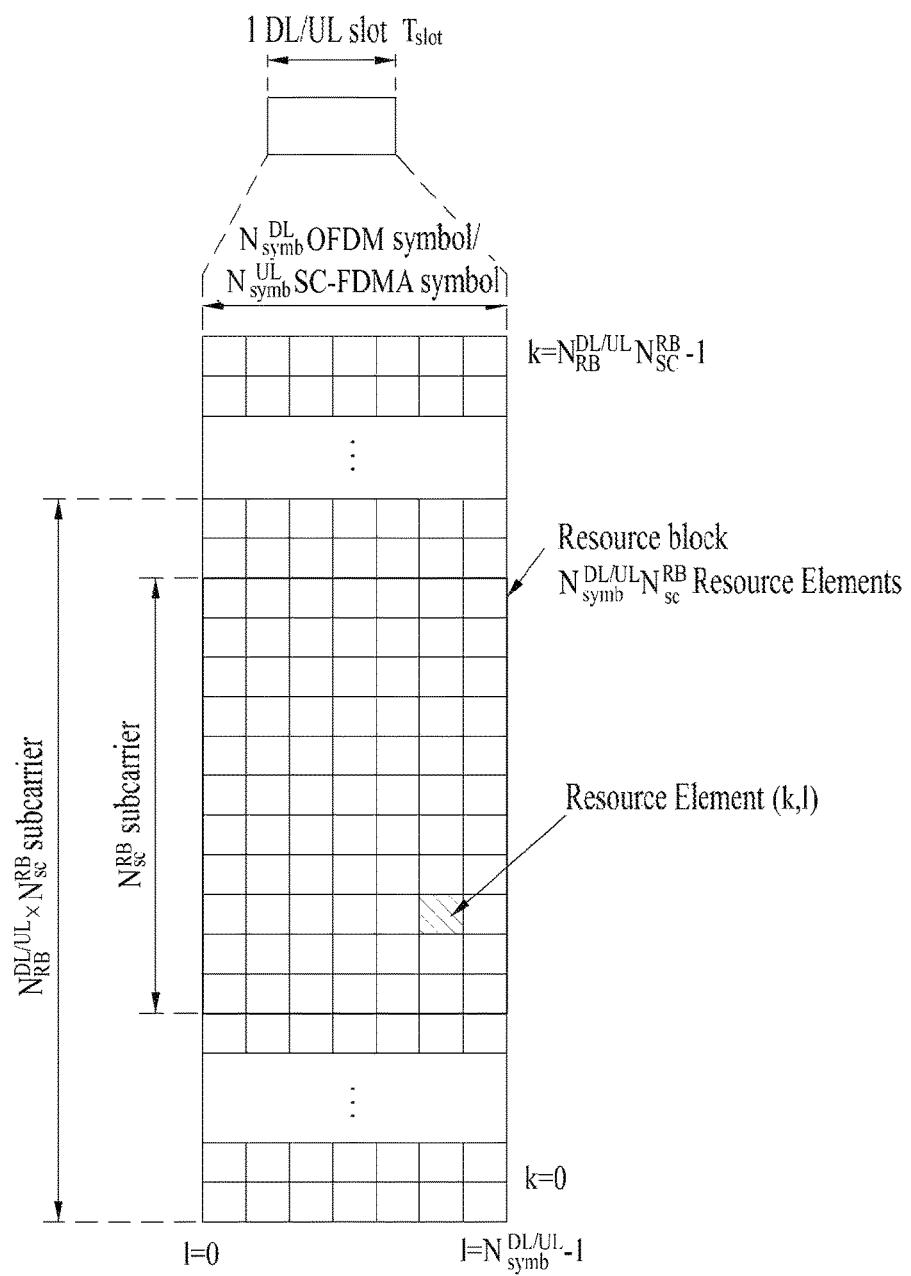
FIG. 2 is a diagram illustrating an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{REs}$. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
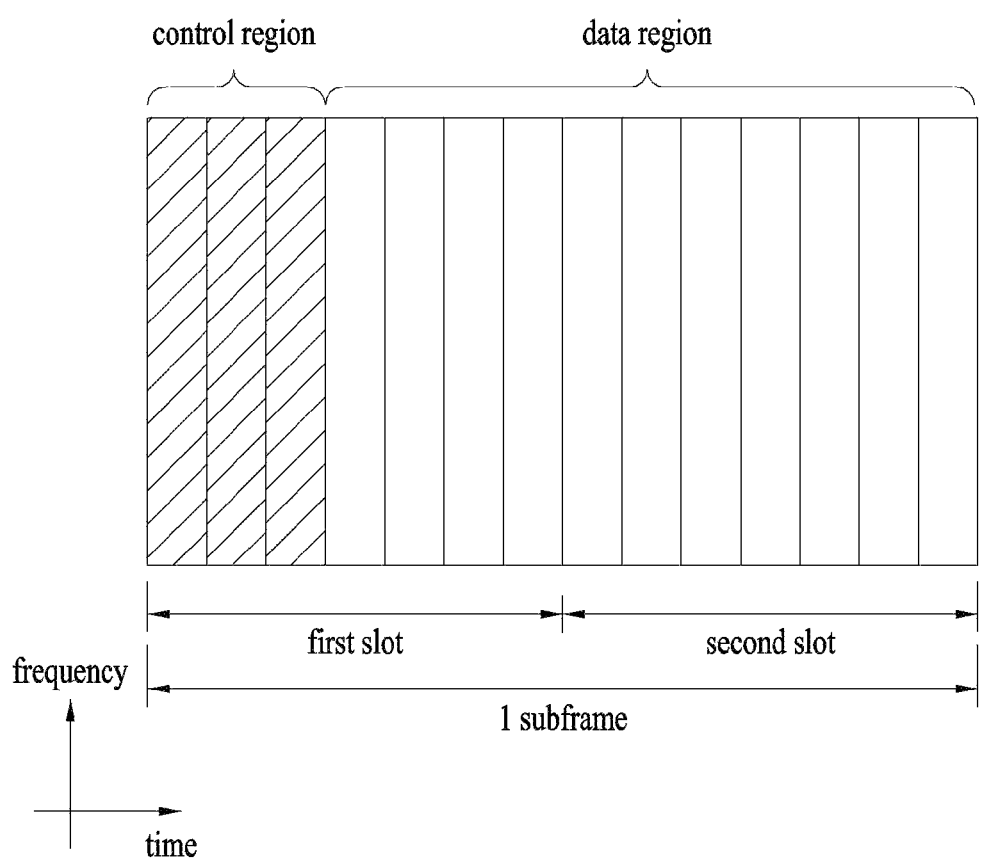
FIG. 3 is a diagram illustrating an example of a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
|---|---|---|---|
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |

TABLE 3-continued

| Search Space | | | Number of PDCCH |
|---|---|---|---|
| Type | Aggregation Level L | Size [in CCEs] | candidates $M^{(L)}$ |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
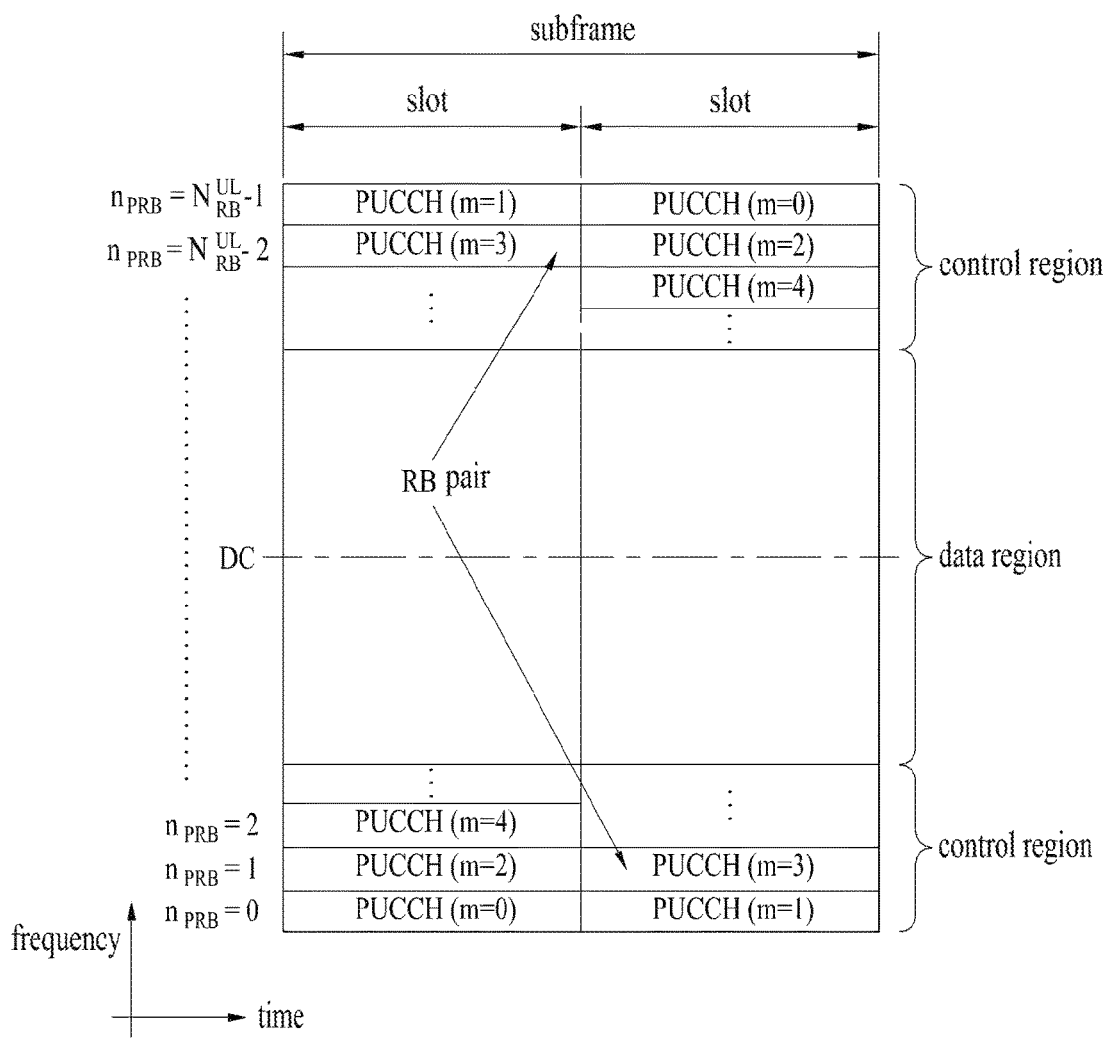
FIG. 4 is a diagram illustrating an example of an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

[Positioning Reference Signal (PRS)]

Figure 5:
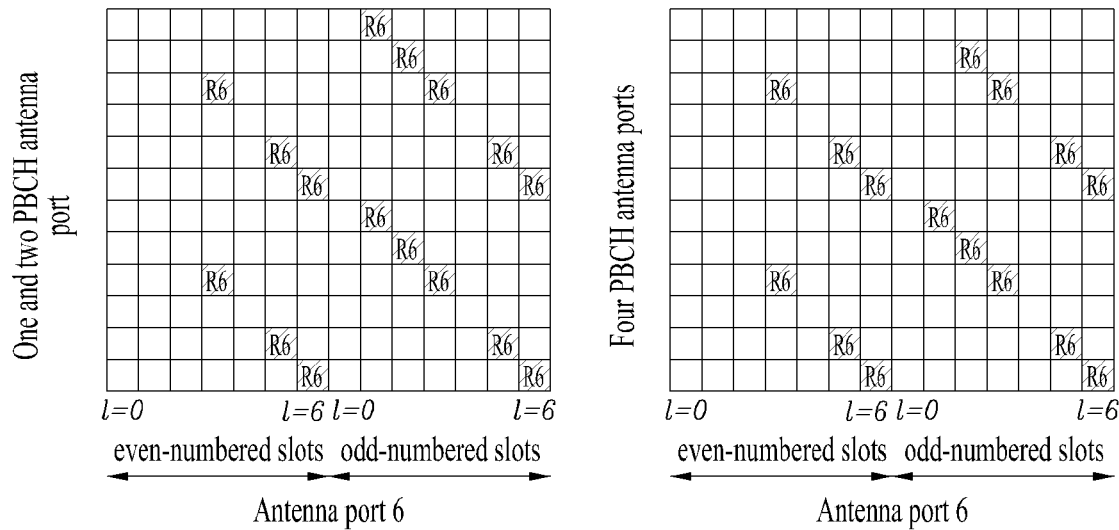
FIGS. 5 and 6 illustrate resource mapping of a positioning reference signal (PRS) used in the 3GPP LTE/LTE-A system.
Figure 6:
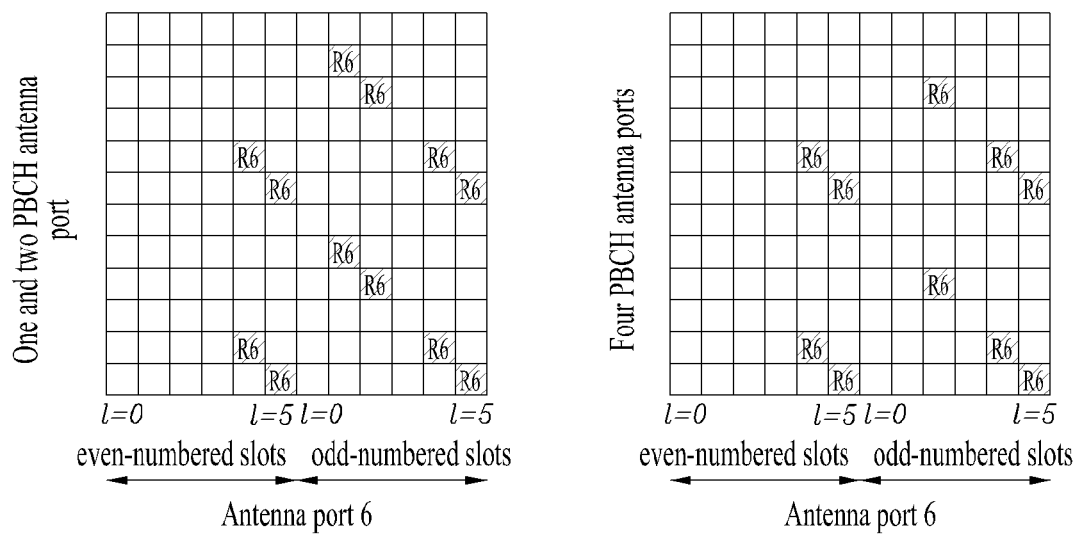

A PRS may have a transmission occasion, namely a positioning occasion with a period of 160 ms, 320 ms, 640 ms, or 1280 ms, and be transmitted for N consecutive DL subframes at the positioning occasion. Herein, N may be set to 1, 2, 4, or 6. The PRS may be substantially transmitted at the positioning occasion, or may be muted on behalf of inter-cell interference control cooperation. The information about PRS muting is signaled to a UE as prs-MutingInfo. The transmission bandwidth of the PRS may be independently configured, in contrast with the system bandwidth of a serving eNB, and transmitted in a frequency band of 6 resource blocks (RBs), 15 RBs, 25 RBs, 50 RBs, 75 RBs, or 100 RBs. A transmission sequence of the PRS is generated by initializing a pseudo-random sequence generator on every OFDM symbol using a function of a slot index, an OFDM symbol index, a cycling prefix (CP) type and a cell ID. The generated transmission sequences of the PRS are mapped to resource elements (REs) according to whether the CP is a normal CP or an extended CP as shown in FIG. 5 (normal CP) and FIG. 6 (extended CP). The positions of the mapped REs may be shifted along the frequency axis, and the value of shift of the REs is determined by the cell ID. For the positions of the PRS transmission REs shown in FIGS. 5 and 6, the frequency shift value is 0.

The UE receives designated configuration information about a list of PRSs to be searched for in a position management server of the network to perform PRS measurement. This information includes PRS configuration information about a reference cell and PRS information about neighboring cells. Configuration information about each PRS includes an occurrence period and offset of a positioning occasion, the number of consecutive DL subframes constituting one positioning occasion, a cell ID used for generation of a PRS sequence, a CP type, and the number of CRS antenna ports considered in performing PRS mapping. Additionally, the PRS configuration information about neighboring cells includes a slot offset and subframe offset of a neighboring cell and a reference cell, an expected reference signal time difference (RSTD), and the degree of uncertainty of the expected RSTD. Thereby, the PRS configuration information supports determining a time and a time window in which a terminal needs to search for a PRS transmitted from a neighboring cell in order to detect the PRS.

The RSTD refers to a relative timing difference between a neighboring cell j and a reference cell i. That is, the RSTD may be expressed as $T_{subframeRxj}-T_{subframeRxi}$, where $T_{subframeRxj}$ denotes a time at which start of a specific subframe is received from a neighboring cell j, and $T_{subframeRxi}$ denotes a time at which the UE receives start of a subframe which is closest to the specific subframe received from neighboring cell j and corresponds to the specific subframe from reference cell i. A reference point for the observed subframe time difference is an antenna connector of the UE.

In this specification, operation of a beacon apparatus for minimal transmission of only PRSs of the LTE system is proposed.

Typically, in a cellular communication system, various methods are used for the network to acquire position information about a UE. A representative example of the methods is a positioning technique based on observed time difference of arrival (OTDOA). According to this technique, in the LTE system, a UE receives configuration of PRS transmission-related information about eNBs through a higher layer signal, measures PRSs transmitted from cells around the UE, and delivers, to an eNB or network, the RSTD, which indicates a difference between the reception time of a PRS signal transmitted from a reference eNB and the reception time of a PRS signal transmitted from a neighboring eNB. Then, the network calculates the position of the UE by utilizing the RSTD and other information. Other available methods include, for example, an assisted global navigation satellite system (A-GNSS) positioning technique, an enhanced cell ID (E-CID) technique and uplink time difference of arrival (UTDOA). Such positioning techniques may be utilized for various position-based services (e.g., advertisements, position tracking, and emergency communication means).

Although the conventional positioning techniques described above are already supported by the 3GPP UTRA and E-UTRA standard (e.g., LTE Rel-9), a higher accuracy is recently required for an in-building positioning method. That is, despite the conventional positioning methods being commonly applicable to outdoor/indoor environments, the typical positioning accuracy of the E-CID technique, for example, is about 150 m in non-LOS (NLOS) environments and about 50 min LOS environments. PRS-based OTDOA also has a limit as the positioning error thereof may exceed 100 m due to an eNB synchronization error, an error according to multipath propagation, an RSTD measurement quantization error of the UE, a timing offset estimation error, and the like. Further, the A-GNSS technique has a limit in terms of complexity required by the GNSS receiver and battery consumption, and use thereof for positioning in a building is constrained.

Figure 7:
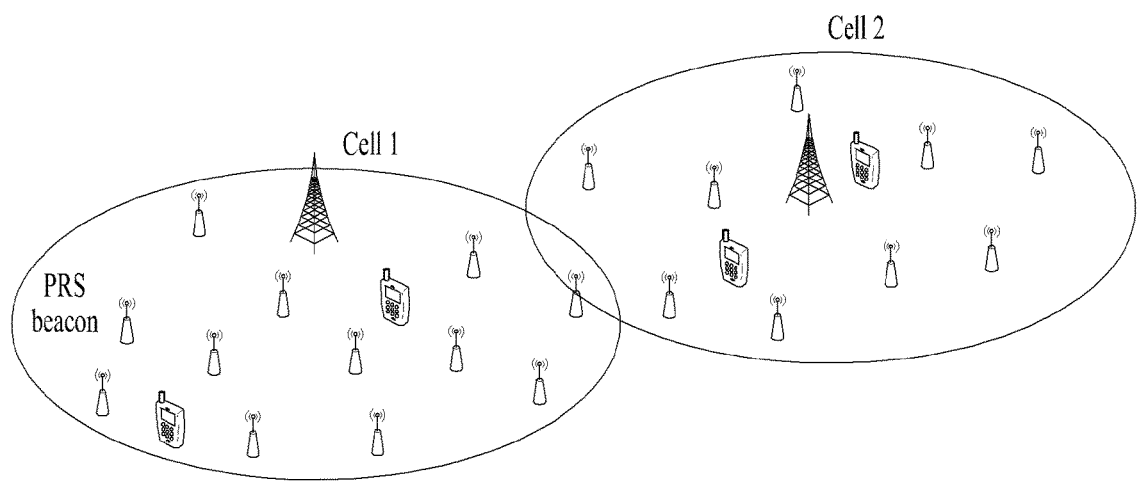
FIG. 7 illustrates deployment of a beacon apparatus in a cell according to an embodiment of the present invention.

One method to overcome such issues is to increase transmission points of the PRS per area by downsizing the cells. With this method, cell coverage is narrowed, and thus sufficient accuracy may be obtained through positioning according to the E-CID technique alone. However, installing many eNBs in the form of a small cell has a limit in terms of cost competitiveness. In this specification, a beacon apparatus for transmitting only PRS signals of the LTE system is proposed such that apparatuses for transmitting PRS signals are easily installed at several locations at low cost. According to the proposal, as shown in FIG. 7, a UE detects PRS signals transmitted from PRS beacon apparatuses positioned close to each other, and thus accuracy of position calculation of the UE may be enhanced. For the PRS beacon apparatus of the LTE system proposed in this specification to be cost-competitive, the PRS beacon apparatus is configured to transmit a signal at low output power and transmission of signals other than the PRS signal is minimized. In addition, the PRS beacon apparatus does not require wired backhaul for minimizing installation costs.

[Procedure of PRS Beacon Registration]

Hereinafter, a description will be given of an initial configuration procedure of a PRS beacon apparatus of the LTE system. When the PRS beacon apparatus is powered on, it performs a registration procedure through cell search and initial access just as a typical LTE terminal does. In the registration procedure, the PRS beacon apparatus reports the ID thereof and a capability such as a transmit power class. In addition, the PRS beacon apparatus performs radio resource management (RRM) measurement on a CRS, CSI-RS and PRS transmitted from a neighboring eNB and sends a report. The report includes a measured value of reference signal received power (RSRP) and a measured value of RSTD. With a certain report, the network may recognize the installation position of the PRS beacon apparatus.

After this procedure, the network signals configuration information about a PRS to be transmitted by the corresponding PRS beacon apparatus. The PRS transmitted by the PRS beacon apparatus may be distinguished from a PRS transmitted from a typical eNB or transmission point regarding several features, and is referred to as a "beacon PRS (B-PRS)". In this case, the network sends the configuration information about the B-PRS transmitted by the PRS beacon apparatus. The configuration information about the B-PRS may include the resource and period of B-PRS transmission, a virtual cell ID for generation of a transmission sequence of the B-PRS, and transmit power. The configuration information about the B-PRS may also include a set timing advance (TA) value for transmission of the B-PRS. The PRS beacon apparatus may maintain frequency synchronization and time synchronization by measuring a CRS transmitted from a serving eNB which has configured B-PRS transmission, in a part of a time interval for which the PRS beacon apparatus does not perform B-PRS transmission, and may transmit the B-PRS at the CRS reception time of the serving eNB by correcting the TA value. The transmission subframe index and system frame number (SFN) of the PRS beacon apparatus may be set to the index of the serving eNB, and the PRS beacon apparatus may transmit the B-PRS in the configured subframe.

Figure 8:
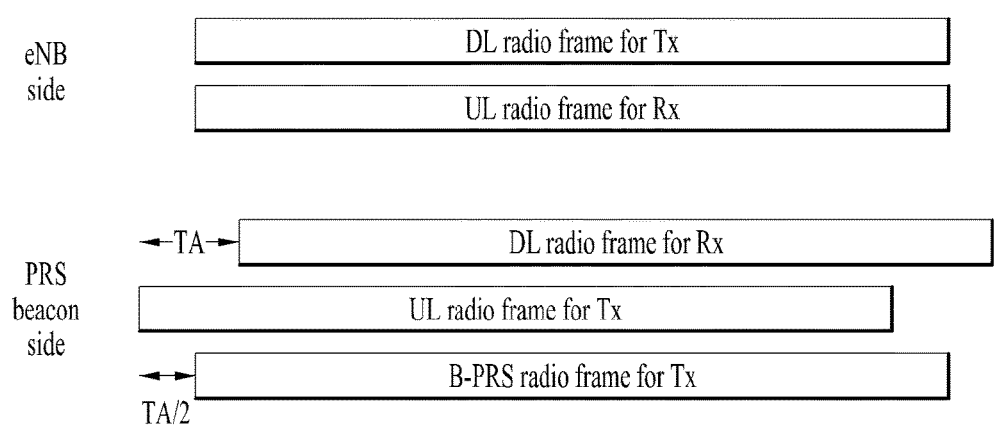
FIG. 8 illustrates time alignment (TA) for a beacon apparatus according to an embodiment of the present invention.

The PRS beacon apparatus is assigned a TA value for UL transmission in the initial access procedure for registration. Accordingly, the TA value for UL transmission may be used as a TA value for B-PRS transmission on DL. Typically, a value corresponding to round trip delay between the eNB and the UE is usually assigned to UL TA such that UL signals of several terminals are aligned and received from the perspective of the eNB. Accordingly, when a DL B-PRS is transmitted according to the value of the UL TA, the transmission time of the DL B-PRS is not synchronized with the DL transmission time of the serving eNB. In another method, as shown in FIG. 8, a value corresponding to half the value of UL TA may be set and used as the TA value of the DL B-PRS.

The TA that the UE actually applies is configured by the sum of a TA command designated by the eNB and a predetermined TA offset. In the TDD system, the TA offset is used to secure a time necessary for switching to DL reception (RX) after finishing UL transmission (TX) to a UE which is positioned very close to an eNB for which the TA offset is set to 624 Ts and to allow the eNB to receive a signal suffering multipath delay on UL before DL TX. Therefore, since the PRS beacon apparatus does not perform at least UL RX, a value obtained by subtracting the TA offset from the UL TA is set and used as the TA value of the DL B-PRS in the TDD system.

As a variant of the aforementioned method, the TA value may be adjusted at the time of end of the UL TX procedure for initial registration of the PRS beacon apparatus and used as a TA value of the DL B-PRS, such that the value of the UL TA may be used as the TA value of the DL B-PRS. Alternatively, when the PRS beacon apparatus signals configuration information about a B-PRS to be transmitted, it may also signal a TA value to be used for B-PRS transmission.

Figure 9:
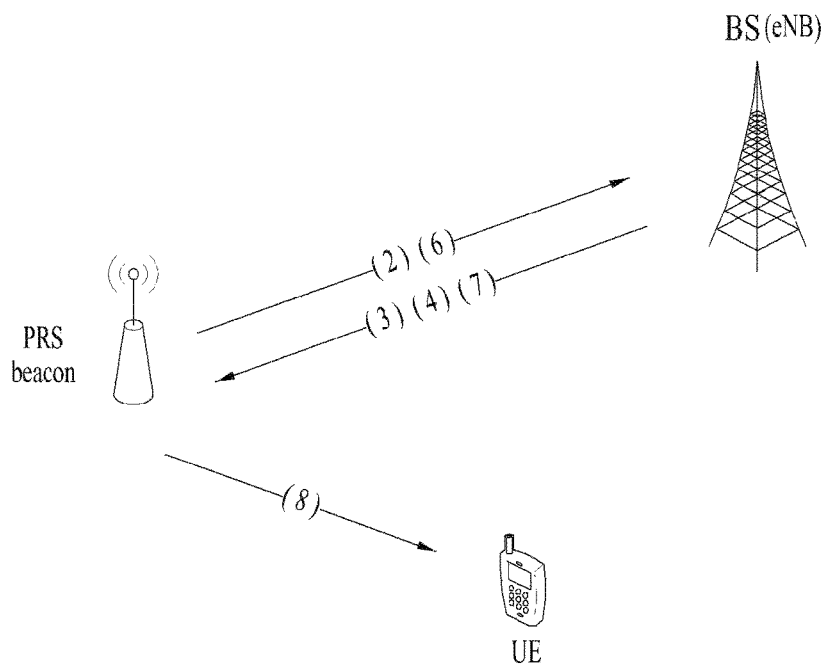
FIG. 9 illustrates a procedure of operations of a beacon apparatus according to an embodiment of the present invention.

An example of the procedure leading up to the operation of transmission of a B-PRS from the proposed PRS beacon apparatus is summarized below with reference to FIG. 9.

(1) Search for a neighboring eNB
(2) Initial access to a network over a random access channel (RACH)
(3) Reception of a neighboring eNB list
(4) Reception of PRS configuration information of the neighboring eNB
(5) Measurement of a CRS and PRS of the neighboring eNB
(6) RRM measurement reporting (RSRP, RSTD, etc.)
(7) Reception of configuration information about a B-PRS to be transmitted by the PRS beacon apparatus
(8) Transmission of the B-PRS according to the B-PRS configuration information The capabilities of the proposed PRS beacon apparatuses may be divided into several classes due to a difference in, for example, the maximum allowable transmit power. The PRS beacon apparatuses may also be divided according to whether they have an independent UL TX capability. For a low-cost PRS beacon apparatus, the maximum transmit power may be lower than 200 mW, which is the maximum transmit power of a typical terminal. A low output power PRS beacon apparatus may not perform the initial registration procedure on its own since it is incapable of independently performing UL TX. The low-output power PRS beacon apparatus may be connected to a typical terminal in a wired manner to ensure the initial registration procedure (operations (1) and (2) above), and perform the registration procedure and the procedure of reception of B-PRS configuration information to be transmitted.

When there is a change in the position of a PRS beacon apparatus having an independent UL TX capability or a change in the environment around the PRS beacon apparatus, the PRS beacon apparatus may perform the initial access procedure and send a corresponding report to the network.

[B-PRS]

In order to use the existing PRS reception module of the UE as a B-PRS reception module without significant modification thereof, the transmission waveforms of most B-PRSs may be set to conform to the PRS transmission waveforms. As a typical example, the PRS transmission RE patterns of FIGS. 5 and 6 may be used as the transmission RE patterns of the B-PRS. As differences between the B-PRS and the PRS, the following factors may be considered. Since tens to hundreds of PRS beacon apparatuses may exist within the coverage of one eNB, the transmit powers of the PRS beacon apparatuses may be set to be low to ensure spatial reuse of transmission resources. In addition, in order to distinguish the B-PRS from the PRS transmitted from the conventional cell, the B-PRS may be generated using a different sequence. Further, the number of sequences of the PRS may be set to be greater than 504, which is the number of the existing cell IDs.

[B-PRS Search Configuration]

An eNB may signal, to the UE, B-PRS configuration information transmitted from a PRS beacon apparatus installed therearound, therey lowering complexity of the B-PRS search procedure in the UE and reducing the time taken for the search procedure. The B-PRS configuration information may include information for a typical B-PRS configuration such as the generation period and offset of a positioning occasion, the number of consecutive DS subframes constituting one positioning occasion, an ID used to generate a B-PRS sequence, a CP type, and the number of CRS antenna ports considered in performing B-PRS mapping. Additionally, the B-PRS configuration information may include a slot offset and subframe offset of a PRS beacon apparatus and a reference cell, an expected RSTD, and the degree of uncertainty of the expected RSTD. Thereby, the B-PRS configuration information supports determining a time and a time window in which a UE needs to search for a B-PRS transmitted from the PRS beacon apparatus to detect the B-PRS.

Since a number of PRS beacon apparatuses exist within the coverage of one eNB, signaling B-PRS configuration information for each of the PRS beacon apparatuses may result in excessive signaling overhead. Accordingly, a large part of the configuration information of B-PRSs transmitted by PRS beacon apparatuses in a certain area is aligned in using the configuration information, and when the configuration information about the B-PRSs is signaled by grouping the PRS beacon apparatuses in the area, the aligned information of the B-PRS group is signaled only once. Thereby, signaling overhead may be reduced.

As a representative example, the B-PRSs transmitted by the PRS beacon apparatuses in a certain area are aligned to have the same generation period and offset of a positioning occasion, the same number of consecutive DS subframes constituting one positioning occasion, the same CP type, and the same number of CRS antenna ports considered in performing B-PRS mapping, but are assigned different IDs for generation of a B-PRS sequence. In this case, the UE may receive all the B-PRS transmission configuration information of a specific B-PRS group at one time, and receive an indication of IDs to be used in the B-PRS group or the range of IDs used in the group.

The B-PRS configuration information may include information indicating a dependency relationship with a PRS transmitted by a typical eNB. One dependency relationship may be established for a B-PRS group. The UE may start the search operation for detection of a corresponding B-PRS only when a B-PRS having the dependency relationship is detected. Alternatively, when the reception quality of a PRS having the dependency relationship is greater than or equal to a certain threshold, the UE performs the search operation for detection of the B-PRS. For example, such dependency relationship may be established between a CRS and a B-PRS That is, the UE is configured to start the search operation for detection of the corresponding B-PRS only when a CRS having the dependency relationship is detected. Alternatively, when the reception quality of a CRS having the dependency relationship is greater than or equal to a certain threshold, the UE may start the search operation for detection of the corresponding B-PRS. Alternatively, when the reception quality of the CRS having the dependency relationship is greater than or equal to a certain threshold, compared to the reception quality of the CRS of the serving cell, the UE may start the search operation for detection of the corresponding B-PRS.

Such dependency relationship may also be established between B-PRSs. A representative PRS beacon apparatus may be configured in a B-PRS group in one area to transmit a B-PRS at a higher power, and the UE may start the search operation for detection of the other B-PRSs in the B-PRS group when the reception quality of the representative B-PRS is greater than or equal to a certain threshold.

[B-PRS TDM]

If PRS beacon apparatuses in the same group transmit B-PRSs using different B-PRS sequences in the same subframe in order to reduce overhead of B-PRS configuration information signaling, detection performance is likely to be degraded as interference between the B-PRSs transmitted by the PRS beacon apparatuses is intensified. For this reason, the transmission subframe of the B-PRSs from the same group may be determined by a B-PRS ID. In the proposed method, a B-PRS sequence and a B-PRS transmission RE pattern may be determined by the B-PRS ID. Additionally, the offset of a B-PRS transmission occasion subframe may be determined by the B-PRS ID.

Alternatively, a B-PRS group may be assigned the same value for the period of the B-PRS transmission occasion subframe and the same value for a common offset, and a dedicated offset for each B-PRS may be determined according to the ID. Thereby, the offset of a transmission occasion subframe for each B-PRS may be determined as the sum of the common offset and a dedicated offset.

[B-PRS Transmit Power]

When the eNB delivers the B-PRS configuration information, the eNB may also deliver transmit power of each B-PRS such that the UE may determine how close to a PRS beacon apparatus the UE is positioned. The UE may calculate path loss based on the difference between the receive power of each B-PRS and the transmit power of the B-PRS signaled by the eNB, and calculate the distance to the PRS beacon apparatus based on the path loss. The transmit powers of the B-PRSs may be signaled individually, or the same transmit power may be signaled for the B-PRS group. Alternatively, the B-PRSs in the B-PRS group may be subdivided into a subgroup of representative B-PRSs and a subgroup of normal B-PRSs, and the transmit power of each subgroup may be individually signaled.

When the measured value of path loss decreases below a certain level, and thus the UE is within a certain distance from the corresponding PRS beacon apparatus, the physical layer of the UE may send a report on the corresponding event to a higher layer. This report may include information indicating a B-PRS for which the path loss or the measured distance is provided. Such report may be delivered to an application layer, and thus the UE may execute a specific service of a pre-indicated application. To this end, a position management server of the eNB or network may pre-signal, to the UE, an application and a service of the application to be executed when the UE is within a certain distance from a transmitter (or PRS beacon apparatus) to transmit a B-PRS.

[Configuration of Report Type]

A PRS beacon apparatus installed at a fixed position and a PRS beacon apparatus, which has an independent UL transmission capability and is thus capable of reporting shift of the position thereof, measure propagation delay of a B-PRS based on the position thereof. Accordingly, it is possible for the PRS beacon apparatuses to estimate the position of the UE. However, a mobile PRS beacon apparatus may require only information about whether or not the UE is at a close distance from the mobile PRS beacon since the position of the mobile PRS beacon is inaccurate. Accordingly, when the UE receives a B-PRS configuration, it may additionally receive configuration information indicating whether RSTD measurement should be performed for the corresponding B-PRS or only RSRP measurement is needed.

[B-PRS FDM]

For a B-PRS for which only RSRP needs to be measured to check if the UE is at a close distance, an accurate reception time need not be measured. Accordingly, in this case, the B-PRS may be transmitted in a narrow band and frequency division multiplexing (FDM) may be performed on the B-PRS for each subband. That is, transmission of B-PRSs is limited to subbands such that a large number of B-PRSs may be transmitted in one subframe without mutual interference. Accordingly, when the UE receives B-PRS configuration information, a transmission subband for each B-PRS may be indicated to the UE. The transmission subband may be represented by the start RB and the last RB thereof in the system band. Alternatively, the transmission subband may be represented by a B-PRS transmission and a frequency offset. According to this method, when configuration information of the same B-PRS is signaled, the transmission subband for each B-PRS may be determined by the B-PRS ID. That is, the PRS beacon apparatuses or B-PRSs in one B-PRS group may be assigned configurations of different transmission subbands.

Figure 10:
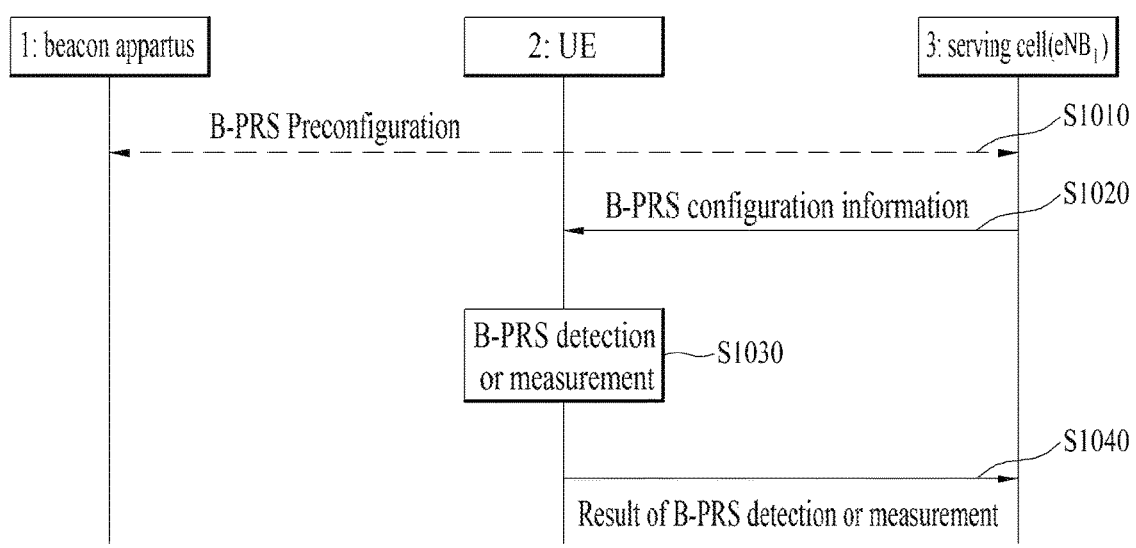
FIG. 10 illustrates operations according to an embodiment of the present invention.

FIG. 10 illustrates operations according to an embodiment of the present invention.

While FIG. 10 illustrates one beacon apparatus, one UE and one serving cell, there may be more beacon apparatuses, and the illustrated beacon apparatus is a representative one of the beacon apparatuses.

The beacon apparatus 1 and the serving cell 3 pre-perform a configuration procedure for a B-PRS for the beacon apparatus to transmit (S1010). This procedure refers to the procedure performed between the PRS beacon and the eNB described above with reference to FIG. 9.

The UE 2 may receive, from the serving cell, the beacon positioning reference signal (B-PRS) configuration information transmitted by one or more beacon apparatuses (S1020). Then, the UE may detect the B-PRS using the B-PRS configuration information (S1030). S1030 may include measurement of the B-PRS, for example, RSTD measurement or RSRP measurement. Then, the UE may transmit the result of measurement or detection of the B-PRS to the serving cell (S1040).

The B-PRS configuration information may include B-PRS group configuration information about one or more beacon apparatus groups. This information is intended to reduce signaling overhead since signaling B-PRS configuration information for individual beacon apparatuses results in excessive signaling overhead.

The B-PRS group configuration information may include a parameter for generating sequences of the B-PRSs transmitted by the respective beacon apparatuses belonging to the corresponding group. The other information or parameters in the B-PRS group configuration information may be commonly applied to all the beacon apparatuses or B-PRSs in the group.

The parameter may determine a subframe in which each beacon apparatus transmits a B-PRS. In addition, the parameter may determine a frequency shift value used in performing resource mapping allowing the respective beacon apparatuses to transmit the B-PRSs. Further, the parameter may determine an offset value for determining a subframe in which each beacon apparatus transmits a B-PRS. The parameter may also determine a resource block in which each beacon apparatus transmits a B-PRS. In other words, a time or frequency resource on which a B-PRS is transmitted may be determined by the parameter. Thereby, the UE may distinguish between the B-PRSs transmitted by the beacon apparatuses in one group, and interference between the B-PRSs may be lessened.

The B-PRS configuration information may include information about transmit power of the B-PRSs. The transmit power may be designated for each B-PRS or for each group. The UE may calculate the value of path loss for the B-PRSs using the transmit power of the B-PRSs. If the calculated value of path loss is less than or equal to a threshold, the UE may trigger a specific event.

The B-PRS information may include information about whether the UE should perform reference signal time difference (RSTD) measurement or reference signal received power (RSRP) measurement for the B-PRSs.

The B-PRS information may include information about a specific reference signal having a dependency relationship with the B-PRSs. If the specific reference signal is detected or the reception quality of the specific reference signal is greater than or equal to a threshold, detection of the B-PRSs may be triggered. The specific reference signal may be configured for each of the groups.

Although embodiments of the present invention have been briefly described with reference to FIG. 10, an embodiment related to FIG. 10 may alternatively or additionally include at least one part of the embodiment(s) described above.

Figure 11:
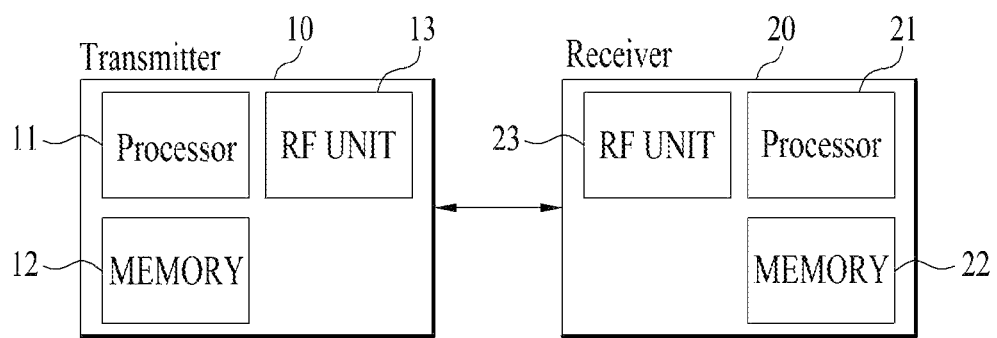
FIG. 11 is a block diagram illustrating apparatuses for implementing embodiment(s) of the present invention.

FIG. 11 is a block diagram illustrating a transmitter 10 and a receiver 20 configured to implement embodiments of the present invention. Each of the transmitter 10 and receiver 20 includes a transceiver unit 13, 23 capable of transmitting or receiving signal that carries information and/or data, a signal, a message, etc. in a wired and/or wireless manner, a memory 12, 22 configured to store various kinds of information related to communication with a wireless communication system, and a processor 11, 21 operatively connected to elements such as the transceiver unit 13, 23 and the memory 12, 22 to control the memory 12, 22 and/or the transceiver unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 400a, 400b may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation on a signal and/or data scheduled by the processor 11 or a scheduler connected to the processor 11, and then transmits a signal and/or data to the transceiver unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded into one codeword, and each codeword is transmitted to the receiver in the form of one or more layers. To perform frequency uplink transformation, the transceiver unit 13 may include an oscillator. The transceiver unit 13 may include Nt transmit antennas (wherein Nt is a positive integer greater than or equal to 1).

The signal processing procedure in the receiver 20 is configured as a reverse procedure of the signal processing procedure in the transmitter 10. The transceiver unit 23 of the receiver 20 receives a radio signal transmitted from the transmitter 10 under control of the processor 21. The transceiver unit 23 may include Nr receive antennas, and retrieves baseband signals by frequency down-converting the signals received through the receive antennas. The transceiver unit 23 may include an oscillator to perform frequency down-converting. The processor 21 may perform decoding and demodulation on the radio signal received through the receive antennas, thereby retrieving data that the transmitter 10 has originally intended to transmit.

The transceiver unit 13, 23 includes one or more antennas. According to an embodiment of the present invention, the antennas function to transmit signals processed by the transceiver unit 13, 23 or to receive radio signals and deliver the same to the transceiver unit 13, 23. The antennas are also called antenna ports. Each antenna may correspond to one physical antenna or be configured by a combination of two or more physical antenna elements. A signal transmitted through each antenna cannot be decomposed by the receiver 20. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the aforementioned antenna. That is, an antenna is defined such that a channel for delivering a symbol on the antenna is derived from the channel for delivering another symbol on the same antenna. A transceiver unit supporting Multiple-Input Multiple-Output (MIMO) for transmitting and receiving data using a plurality of antennas may be connected to 2 or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter 10 and/or receiver 20 may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to communication devices such as a UE, a relay, and an eNB.

The invention claimed is:

1. A method for receiving beacon-positioning reference signals (B-PRSs) for determining position in a wireless communication system, by a terminal, the method comprising:
   receiving, from a serving cell, B-PRS configuration information transmitted by one or more beacon apparatuses;
   detecting B-PRSs based on the B-PRS configuration information; and
   measuring, by the terminal, reference signal received power (RSRP) for the B-PRSs based on the B-PRS configuration information,
   wherein the B-PRS configuration information comprises B-PRS group configuration information about one or more beacon apparatus groups, and measurement information, and
   wherein the B-PRS group configuration information comprises a parameter for generating a sequence of B-PRSs, transmitted by each beacon apparatus belonging to a corresponding one of the one or more beacon apparatus groups.

2. The method according to claim 1, wherein the parameter indicates a subframe used for each of the beacon apparatuses to transmit a B-PRS.

3. The method according to claim 1, wherein the parameter indicates a frequency shift value used for resource mapping allowing each of the beacon apparatuses to transmit a B-PRS.

4. The method according to claim 1, wherein the parameter indicates an offset value to determine a subframe used for each of the beacon apparatuses to transmit a B-PRS.

5. The method according to claim 1, wherein the parameter indicates a resource block used for each of the beacon apparatuses to transmit a B-PRS.

6. The method according to claim 1, wherein when the RSRP is measured,
   calculating a path loss value for the B-PRSs based on the RSRP; and
   triggering a specific event when the calculated path loss value is less than or equal to a threshold.

7. A terminal configured to receive beacon-positioning reference signals (B-PRSs) for determining position in a wireless communication system, the terminal comprising:
   a receiver and transmitter; and
   a processor, operatively coupled to the receiver and transmitter, wherein the processor is configured to:
      control the receiver to receive, from a serving cell, B-PRS configuration information transmitted by one or more beacon apparatuses,
      detect B-PRSs based on the B-PRS configuration information; and
      measure reference signal received power (RSRP) for the B-PRSs based on the B-PRS configuration information,
   wherein the B-PRS configuration information comprises B-PRS group configuration information, about one or more beacon apparatus groups, and measurement information, and
   wherein the B-PRS group configuration information comprises a parameter, for generating a sequence of B-PRSs transmitted by each beacon apparatus belonging to a corresponding one of the one or more beacon apparatus groups.

8. The terminal according to claim 7, wherein the parameter indicates a subframe used for each of the beacon apparatuses to transmit a B-PRS.

9. The terminal according to claim 7, wherein the parameter indicates a frequency shift value used for resource mapping allowing each of the beacon apparatuses to transmit a B-PRS.

10. The terminal according to claim 7, wherein the parameter indicates an offset value to determine a subframe used for each of the beacon apparatuses to transmit a B-PRS.

11. The terminal according to claim 7, wherein the parameter indicates a resource block used for each of the beacon apparatuses to transmit a B-PRS.

12. The terminal according to claim 7, wherein the processor is further configured to:
   calculate a path loss value for the B-PRSs based on the RSRP, when the RSRP is measured; and
   trigger a specific event when the calculated path loss value is less than or equal to a threshold.

* * * * *